Figure 1:
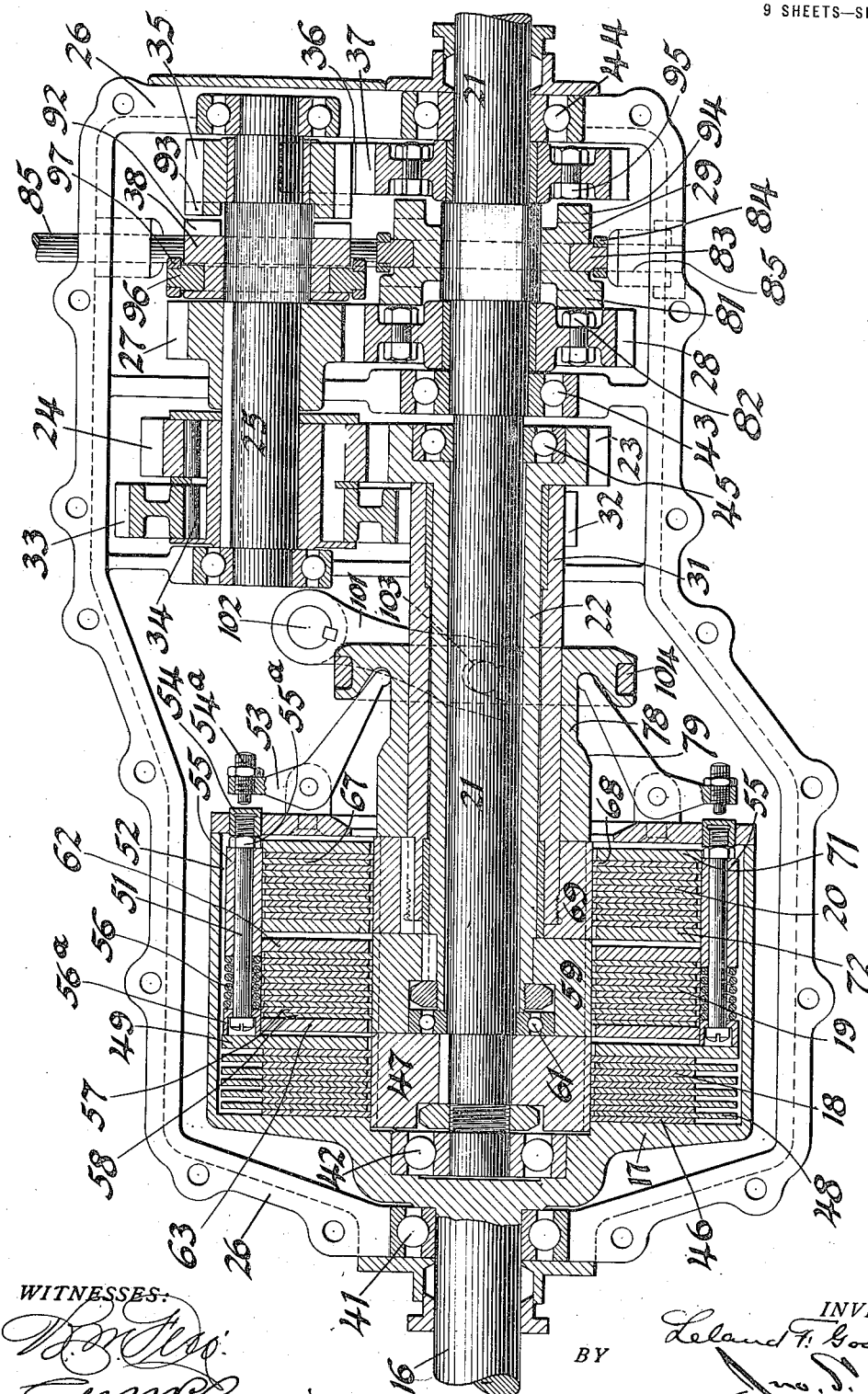

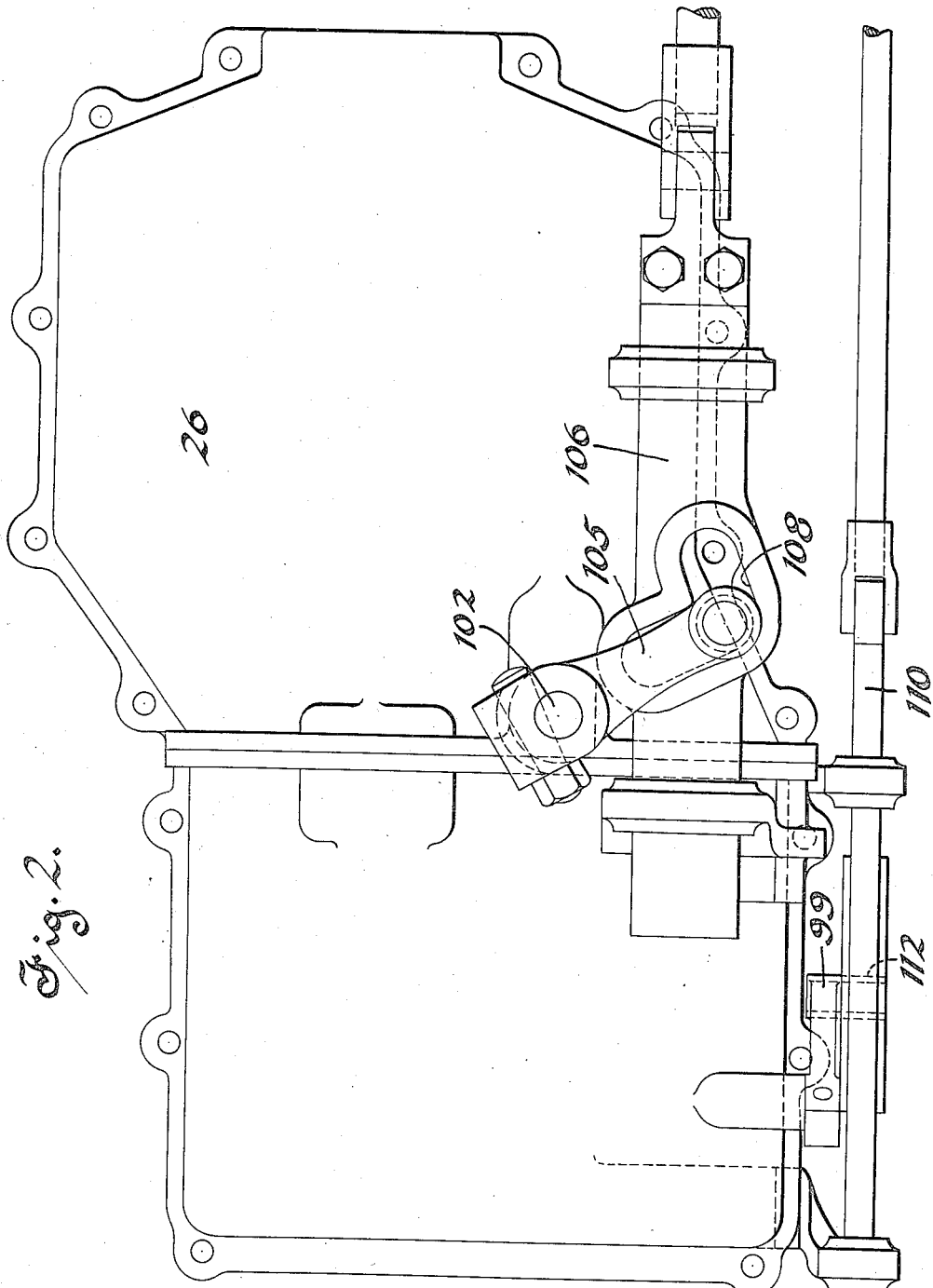

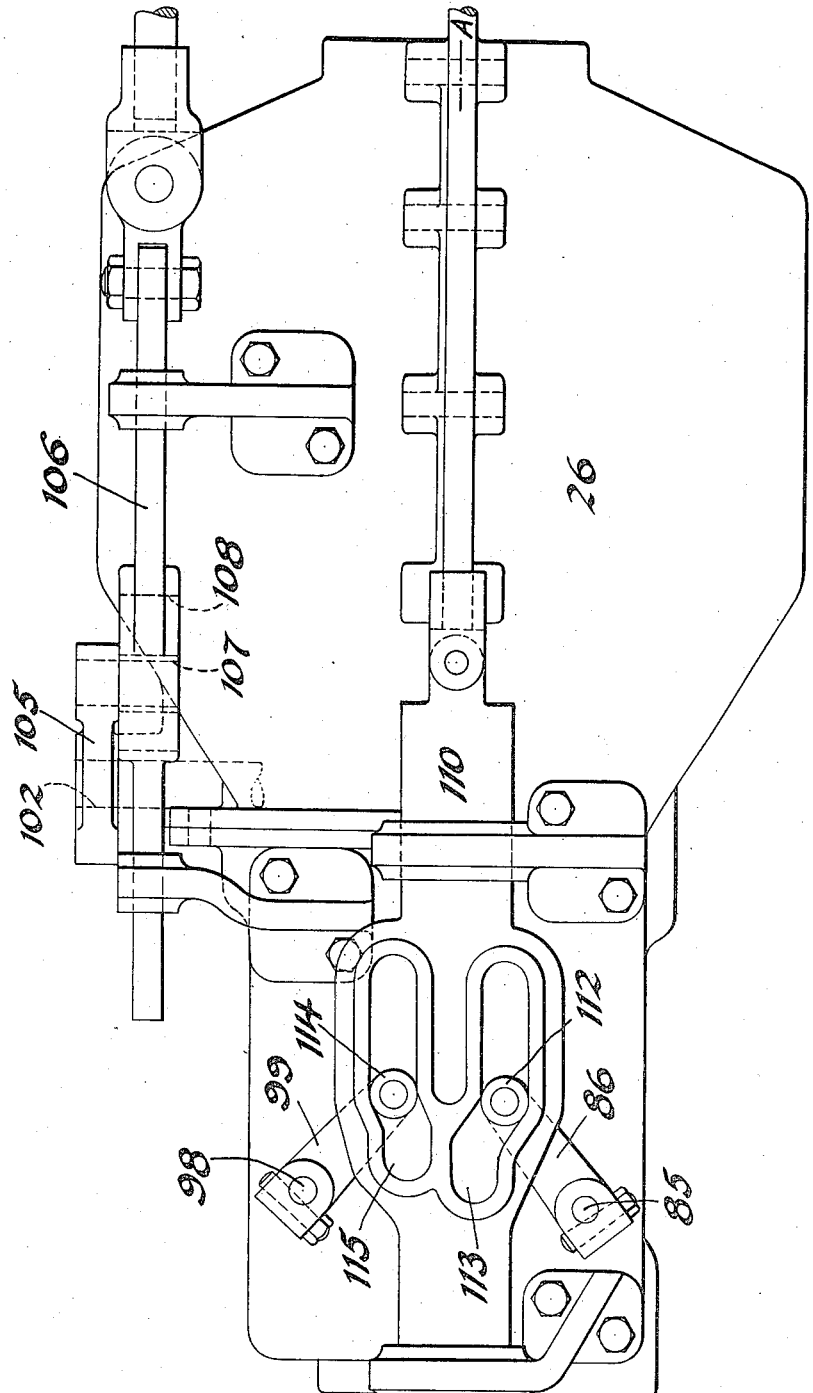

L. F. GOODSPEED.
POWER TRANSMISSION MECHANISM.
APPLICATION FILED OCT. 29, 1908.
1,158,799.
Patented Nov. 2, 1915.
9 SHEETS—SHEET 4.
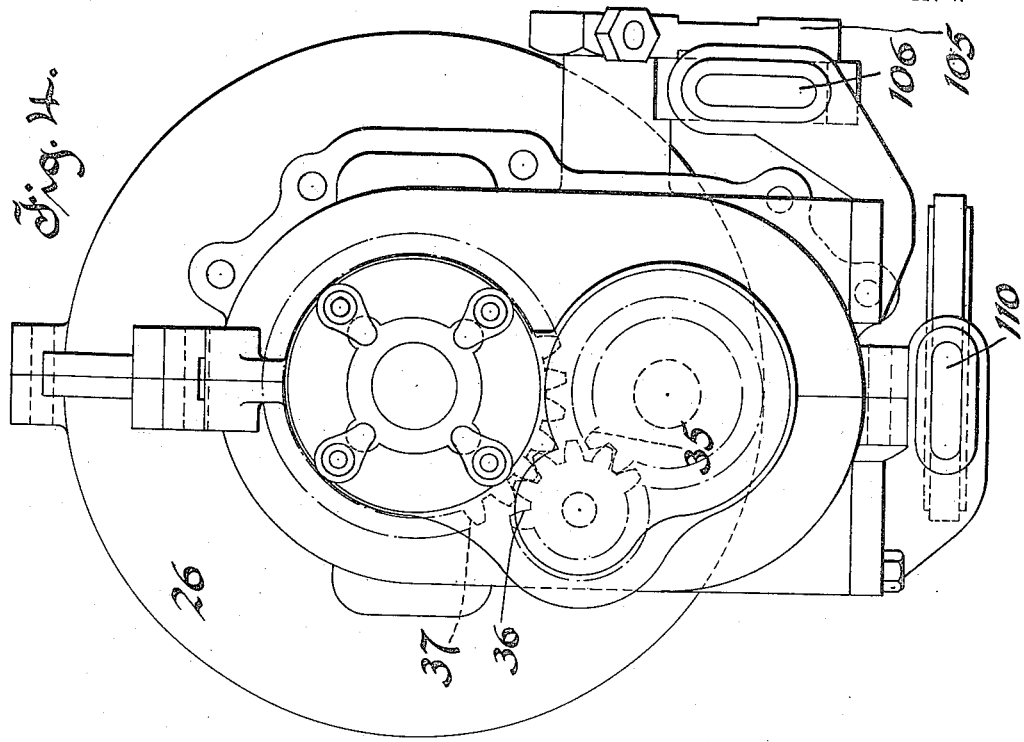
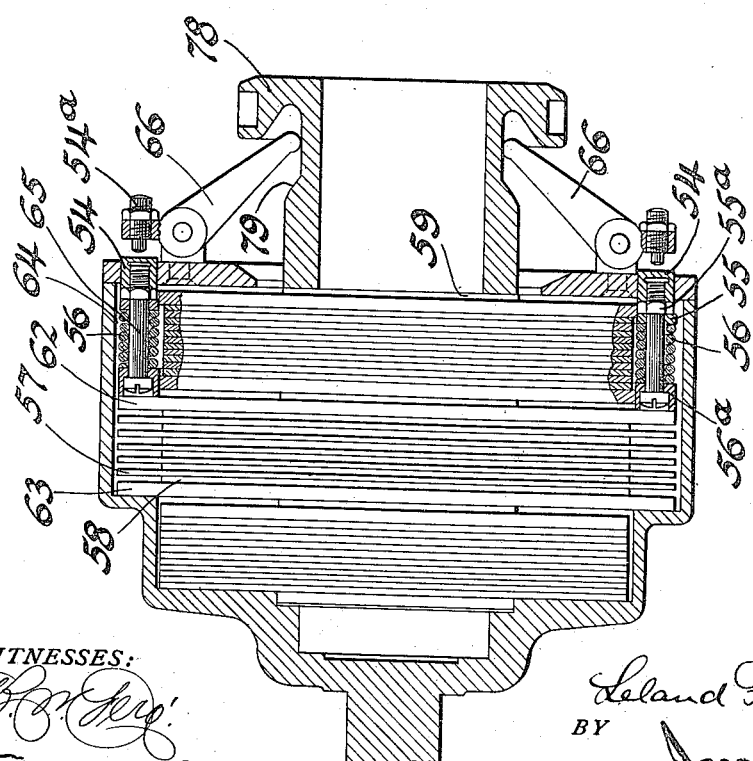
WITNESSES:
INVENTOR.
Leland F. Goodspeed.
BY
ATTORNEY IN FACT.

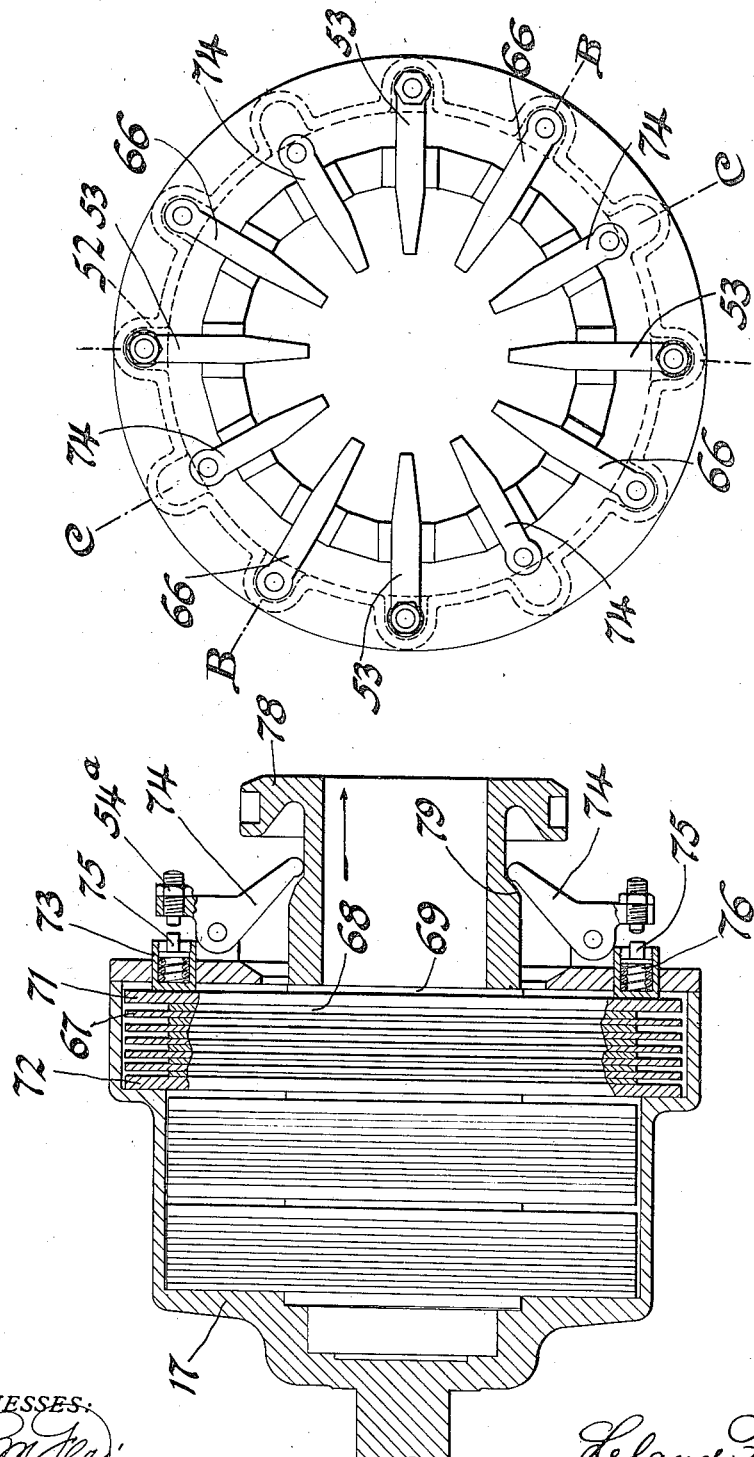

L. F. GOODSPEED.
POWER TRANSMISSION MECHANISM.
APPLICATION FILED OCT. 29, 1908.

1,158,799.

Patented Nov. 2, 1915.
9 SHEETS—SHEET 6.

WITNESSES:

INVENTOR.
Leland F. Goodspeed.
BY
his ATTORNEY IN FACT.

L. F. GOODSPEED.
POWER TRANSMISSION MECHANISM.
APPLICATION FILED OCT. 29, 1908.
1,158,799.
Patented Nov. 2, 1915.
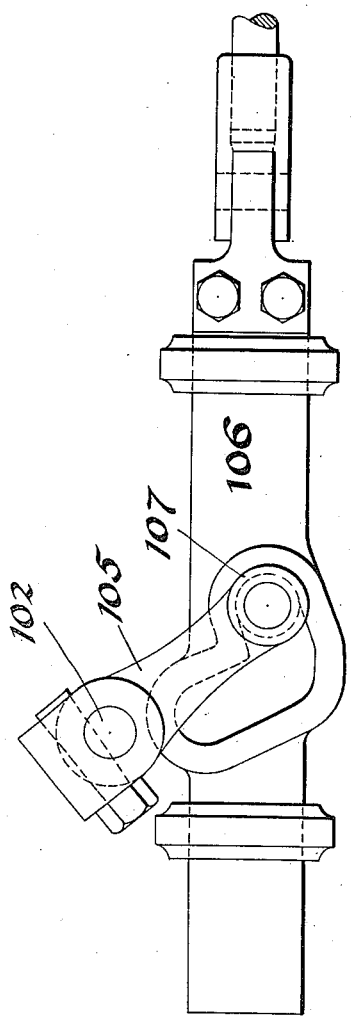
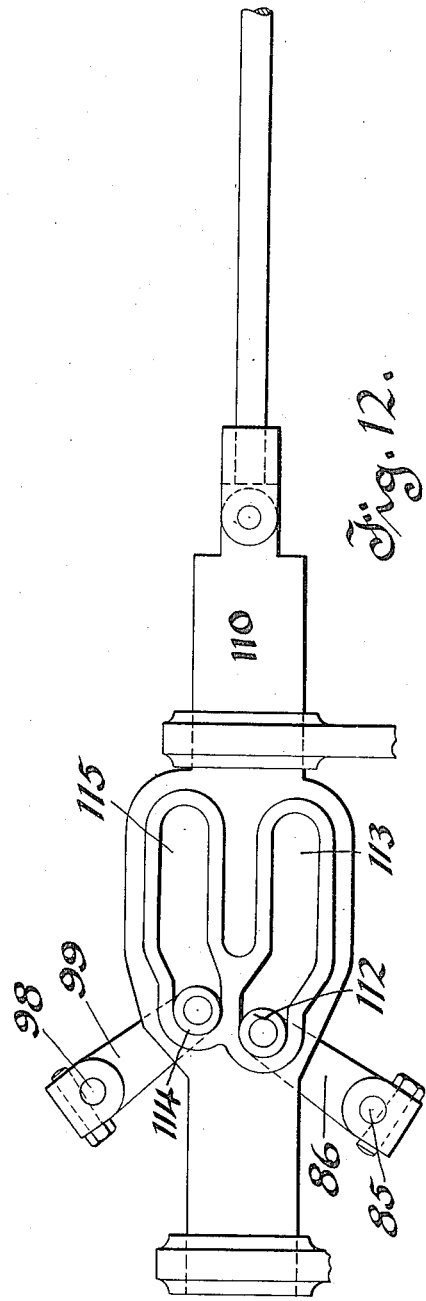

L. F. GOODSPEED.
POWER TRANSMISSION MECHANISM.
APPLICATION FILED OCT. 29, 1908.

1,158,799.

Patented Nov. 2, 1915.
9 SHEETS—SHEET 8.

WITNESSES:

INVENTOR
Leland F. Goodspeed.
BY
Jno. P. Green,
his ATTORNEY IN FACT.

L. F. GOODSPEED.
POWER TRANSMISSION MECHANISM.
APPLICATION FILED OCT. 29, 1908.

1,158,799.

Patented Nov. 2, 1915.
9 SHEETS—SHEET 9.

WITNESSES:

INVENTOR.
Leland F. Goodspeed,
BY
ATTORNEY IN FACT.

UNITED STATES PATENT OFFICE.

LELAND F. GOODSPEED, OF PITTSBURGH, PENNSYLVANIA, ASSIGNOR TO HERMAN H. WESTINGHOUSE, OF NEW YORK, N. Y.

POWER-TRANSMISSION MECHANISM.

1,158,799.      Specification of Letters Patent.      Patented Nov. 2, 1915.

Application filed October 29, 1908. Serial No. 460,075.

*To all whom it may concern:*

Be it known that I, LELAND F. GOODSPEED, a citizen of the United States, and a resident of Pittsburgh, in the county of Allegheny and State of Pennsylvania, have made a new and useful Invention in Power-Transmission Mechanism, of which the following is a specification.

This invention relates to speed change or power transmission mechanisms, and has for an object the production of a mechanism in which power is continually applied by the driving to the driven member while the mechanism is in operation and during the time of changing the speed ratios between the driving and driven members.

A further object is the production of a transmission mechanism in which change speed gear trains are utilized and in which means are employed for eliminating the danger of stripping the gear teeth during the operation of shifting from one gear train to another.

A further object is the production of a mechanism in which means are employed for preventing the accidental shifting of the change speed devices and the throwing into operation of the wrong combination of gear members.

A further object is the production of an interlocking device which prevents the reversing gear train of the transmission mechanism from being thrown into operation while the ahead gear trains are in operation.

A further object is the production of a transmission mechanism in which means are employed for shifting, by means of a single lever, from a high to a low speed and vice versa, or to the reversing gears of the mechanism.

A further object is the production of a transmission mechanism employing reversing gears which are continually in mesh but which are idle and do not rotate while the ahead gears of the mechanism are transmitting power.

A further object is the production of a power transmission mechanism in which a bearing is provided for the main shaft of the mechanism so located as to prevent flexure of the main shaft and the attendant difficulties resulting in the gear trains.

A further object is the production of a transmission mechanism, which is effective in operation, of simple construction and easy to manipulate.

These and other objects I attain in the device embodying the features illustrated in the drawings accompanying this application and forming a part thereof.

Figure 8:
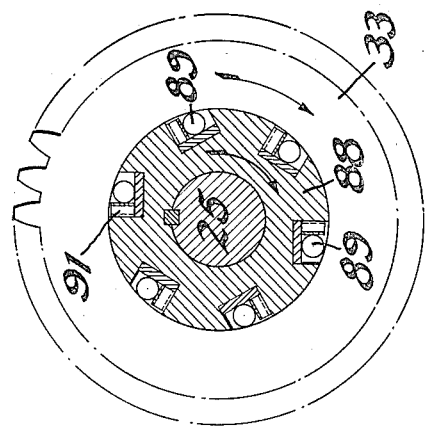
Figure 9:
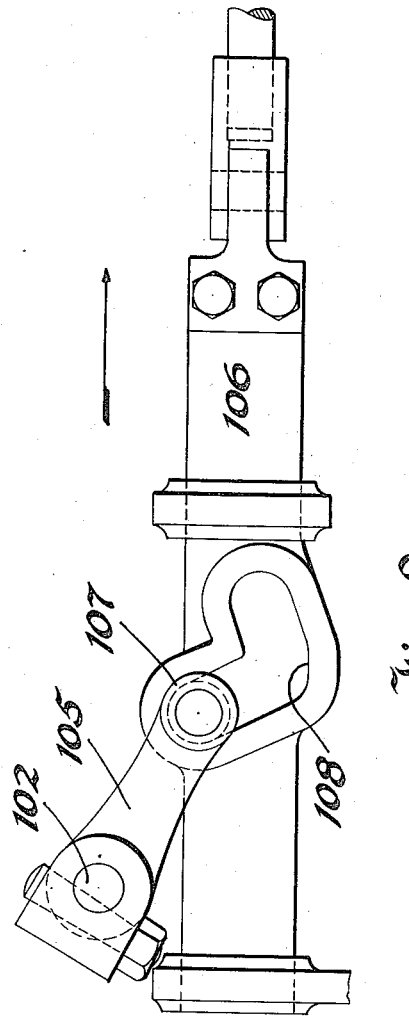
Figure 10:
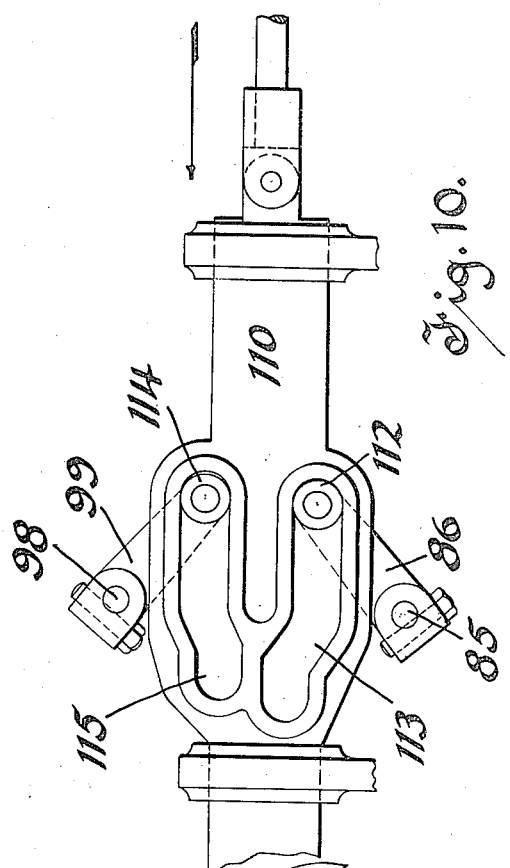
Figure 13:
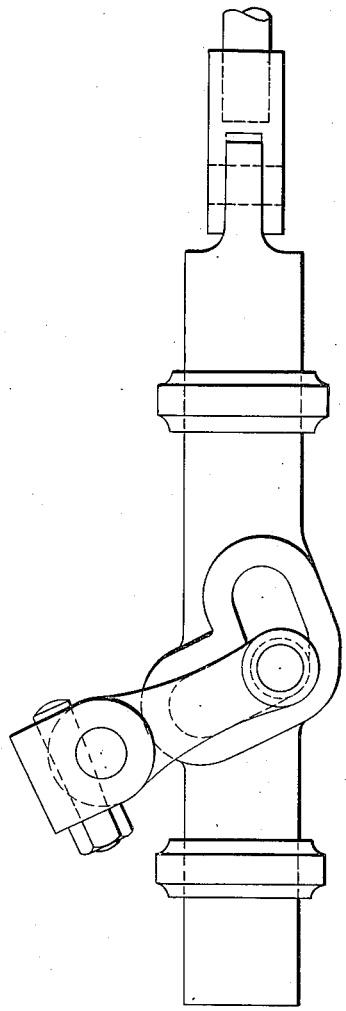
Figure 14:
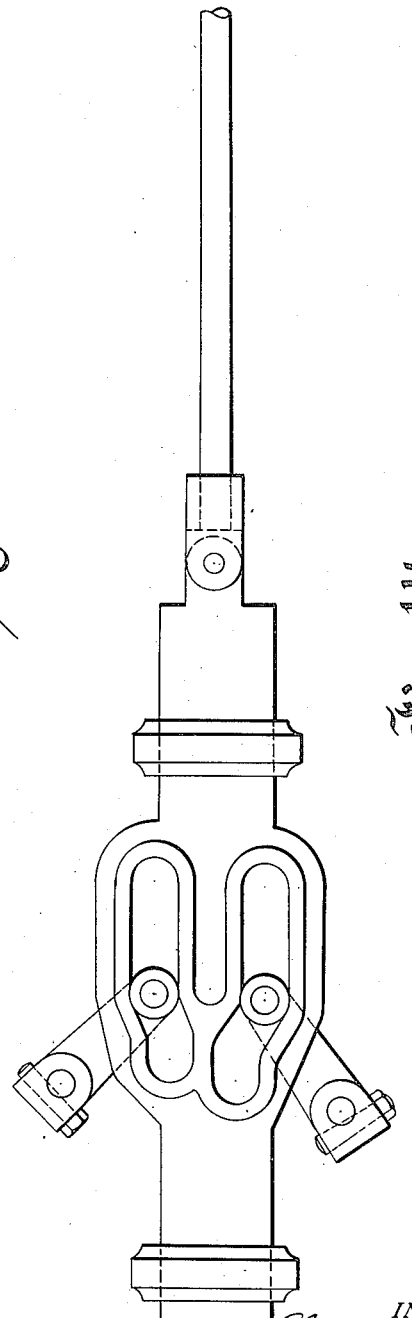
Figure 15:
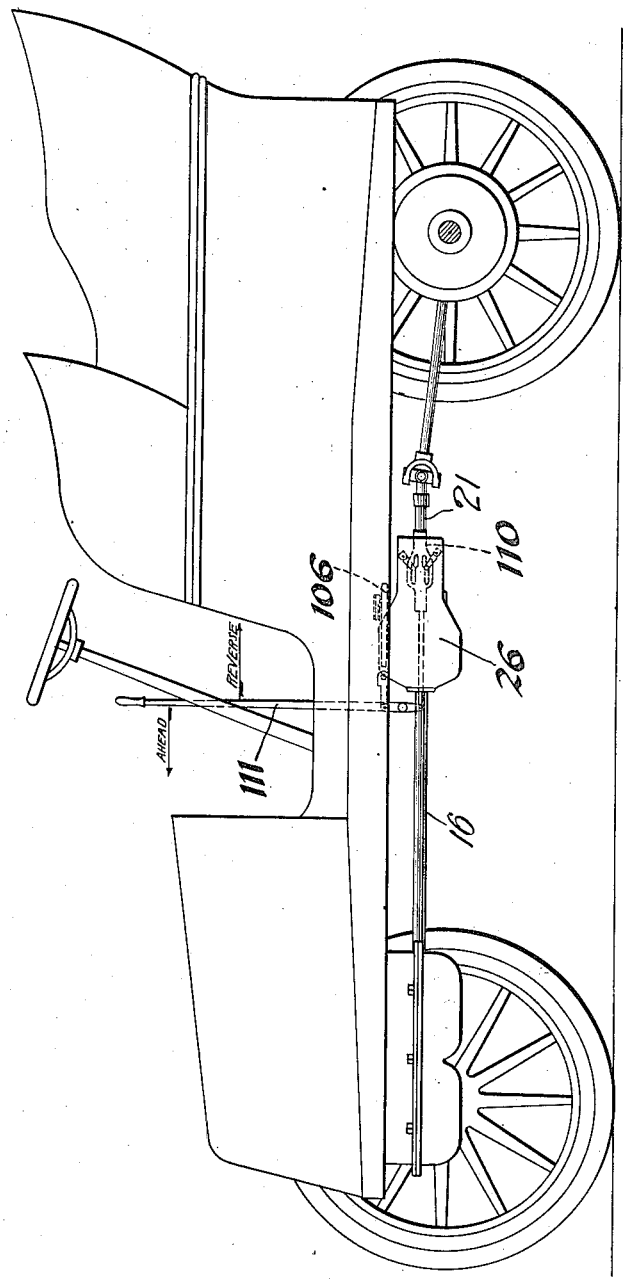

Figure 1 is a sectional view along the line A—A of Fig. 3 and discloses an apparatus embodying my invention; Fig. 2 is a plan view of a casing inclosing the transmission mechanism, and in connection with operating links employed in operating the transmission mechanism; Fig. 3 is a side elevation of the apparatus shown in Fig. 2; Fig. 4 is an end view of the apparatus illustrated in Figs. 2 and 3; Fig. 5 is a section along the line B—B of Fig. 7 and illustrates the internal arrangement and operating mechanism of the intermediate speed clutch mechanism; Fig. 6 is a section along the line C—C of Fig. 7 and illustrates the internal arrangement and operating mechanism of the low speed clutch mechanism; Fig. 7 is an end view of a cage in which the high, intermediate and low speed clutch mechanisms are located and it illustrates the arrangement of the separate operating fingers or levers which are employed for each of the clutch mechanisms; Fig. 8 is a sectional view of an overrunning or ratchet device which forms a detail of my invention; Fig. 9 is an elevation of an operating link employed in controlling the operation of the clutch mechanisms; Fig. 10 is an elevation of an operating link employed in controlling the operation of an auxiliary clutch device and a reversing mechanism. The apparatus shown in Figs. 9 and 10 are controlled by the same lever and are illustrated in the full ahead position; Figs. 11 and 12 illustrate the apparatus shown respectively in Figs. 9 and 10 and disclose their relative positions when each are in the reverse position; Figs. 13 and 14 illustrate the apparatus shown respectively in Figs. 9 and 10 when moved to the inoperative or neutral position; and, Fig. 15 is a diagrammatic illustration of an automobile equipped with a transmission mechanism embodying my invention.

The mechanism illustrated in the drawings includes a high, an intermediate, a low and a reversing gear train. The gears comprised in the separate gear trains are continually in mesh and are thrown into operation by means of a friction disk clutch mechanism and coöperating jaw clutches. The friction clutch mechanism and the jaw clutches are interdependent and the operating mechanism is so arranged that the jaw clutches, which in themselves are not capable of throwing the transmission mechanism into operation, are thrown into clutching operation just prior to the friction clutch.

Referring to the drawings: A motor or engine driven shaft 16 is directly connected to a cage or casing 17 of a friction disk clutch mechanism. The clutch mechanism consists of three separate groups 18, 19 and 20 of interleaving friction disks which are separately controlled and which respectively control the operation of the high, intermediate and low speed gears of the transmission mechanism. The group 20 is also adapted to control the operation of the reversing mechanism.

The group 18 comprises the high speed clutch mechanism and when thrown into operation directly connects the shaft 16 with a main shaft 21 through the agency of the cage 17. The group 19 comprises the intermediate clutch mechanism and when thrown into operation connects the shaft 16, through the agency of the cage 17, to a telescoping shaft 22 which surrounds the shaft 21 and on the end of which a gear 23 is integrally formed. The gear 23 meshes with a gear 24, which is keyed on a shaft 25 and which is provided with an overrunning device or ratchet which permits it to overrun when the high speed clutch mechanism is transmitting power.

The shaft 25 extends parallel to the shaft 21 and is journaled within a casing 26 which incloses the cage 17 and the change-speed reversing gears included in the mechanism. Power is transmitted from the shaft 25 by a gear 27 keyed thereon and a gear 28 meshing with it and loosely mounted on the shaft 21.

The gear 28 is adapted to be locked to the shaft 21 by means of a jaw clutch device 29 feathered on the shaft 21 and which is capable of being shifted longitudinally along the shaft.

The group 20 of interleaving disks comprise the low speed clutch mechanism and is adapted to transmit the motion of the shaft 16 to a telescoping shaft 31 which surrounds the shaft 22 and which is provided at one end with an integrally formed gear 32 which meshes with a gear 33. The gear 33 is keyed on the shaft 25 and is provided with an overrunning device or ratchet 34 which permits it to overrun when the low speed clutch mechanism is not effective in transmitting power.

The reversing gear train comprises a gear 35, loosely mounted on the shaft 25, an idler 36, which meshes with the gear 35, and a gear 37 loosely mounted on the shaft 21.

The gear 35 is adapted to be locked to the shaft 25 by a jaw clutch device 38 feathered on the shaft 25 and which is adapted to move longitudinally along it. The gear 37 is adapted to be locked to the shaft 21 by means of the clutch device 29 which is feathered on the shaft 21.

The gears 35, 36 and 37 stand idle when the ahead gear trains are in operation. This is a novel feature of my invention and is different from any transmission mechanisms known to me. The excessive speed of the small idler gears of the ordinary transmission mechanism, that is, the gears which correspond to my gear 36, are objectionable for the reason that they throw the oil or other lubricant from the gear box which renders it difficult to lubricate the bearings. In addition to this the wear on the reversing gear train is a serious difficulty which my invention overcomes.

The end of the shaft 16 is provided with a ball bearing 41 located in the casing 26. The shaft 21 is provided with a ball bearing 42 located between it and the cage 17, a ball bearing 43 and a ball bearing 44, each of which is mounted in the casing 26.

The bearing 43 is so located relative to the change speed gear trains that it prevents the shaft 21 from springing and consequently prevents the difficulties which would arise in the gear trains as a result of a flexure of the shaft. The shaft 21 is provided throughout with ball bearings and operates in ball bearings for all the speeds of the transmission mechanism; no sleeve couplings or sleeve bearings are employed. The shaft 25 is provided with ball bearings supported by the casing 26. A ball bearing 45 is provided between the shaft 21 and the telescoping shaft 22 and is located immediately adjacent to the gear 23.

The high speed clutch device comprises the group of interleaving disks 18 and consists of a series of circular disks 46 mounted on a hub portion 47 and a series of disks 48 which interleave with the disks 46 and which are secured to the cage 17. The hub portion 47 is keyed on the shaft 21. The disks 46 and the disks 48 are capable of moving longitudinally of their respective mounting elements and are, therefore, capable of being forced into gripping contact one with the other. A pressure plate 49 is secured to the cage 17 and is actuated by means of pins 51 to move longitudinally of the hub portion 47 and to force the interleaving disks 46 and 48 into gripping contact. The plate 49 and each of the disks 48 are provided with four circumferentially located radially extending lugs which project into longitudinally extending channels 52 formed in the cage 17. The lugs on the plate and on the disks are adapted to hold the plate and the disks in place against rotation relative to the cage 17. The plate 49 is of such section as to transmit a substantially equal pressure across the faces of the interleaving disks when it is actuated by the pins 51. The pins 51 are four in number and one is located in each of the channels 52. Each pin is so arranged within its mounting channel that it is capable of moving longitudinally in response to pressure transmitted to it by an operating finger 53. There are four operating fingers 53 and each is fulcrumed on the end wall of the cage 17. The end of each pin 51 is incased within a cap or plug 54 which extends through the wall of the cage and which is adapted to contact with an adjusting screw 54$^a$ provided in the end of the operating finger 53.

A sleeve 55 surrounds each pin and abuts against an adjusting nut 55$^a$, which is threaded onto the pin. A coil spring 56 surrounds each pin and operates between the sleeve 55 and a spring plug 56$^a$, through which the pin projects and which is provided with flanges which surround the head of the pin and which transmit the pressure of the operating finger 53 to the pressure plate 49. This construction insures that an equal pressure is transmitted to the plate 49 by each of the fingers 53 since the pressure is transmitted, in each case, through one of the springs 56. This also obviates the necessity of a close adjustment of the fingers and eliminates the necessity of a nice adjustment for wear. The nuts 55$^a$ may be adjusted from time to time to take up the wear, and the wear during the intermediate periods between adjustments is taken up by the tension of the springs.

The group 19 of interleaving disks comprises the intermediate clutch mechanism and is composed of disks 57 which are secured to the cage 17 and interleaving disks 58 which are keyed on a hub 59. The hub 59 is keyed on the shaft 22 and a ball bearing 61 is located between it and the shaft 21. A pressure plate 62 is secured to the cage 17 and is adapted to compress the interleaving disks 57 and 58 against a backing plate 63 secured to the cage 17. The pressure plate 62 and backing plate 63 and the friction disks 57 are each provided with four circumferentially located radially extending lugs which project into longitudinally extending channels 64 provided in the cage 17 and which secure the plates and the disks in place against rotation relative to the cage. The lugs of the backing plate 63 are held against shoulders formed on the cage and the plate is consequently limited in its longitudinal motion. An operating pin 65 is located in each channel 64 and the pins are adapted to move the pressure plate 62, and, consequently the interleaving disks 57 and 58, longitudinally and to force them into gripping contact one with the other. This locks the cage 17 to the hub 59 and consequently to the shaft 22.

The pins 65 are similar to the pins 51 and are actuated by means of fingers 66 fulcrumed on the wall of the cage 17. Each finger 66 is provided at its outer end with an adjusting screw 54$^a$ which contacts with the cap or plug 54 inclosing the end of the pin. Each pin 65 is surrounded by a coil spring 56 which transmits the pressure exerted by the fingers 66 to the pressure plate 62. This equalizes the pressure exerted by the fingers and eliminates the necessity of a nice adjustment for wear and a close adjustment of the fingers.

The group 20 of interleaving disks comprises the low speed clutch mechanism and includes interleaving disks 67 and 68 which are respectively secured to the cage 17 and a hub portion 69 which is keyed on the shaft 31. The disks 67 and 68 are similar to the respective disks 57 and 58 of the group 19 and are located between pressure plate 71 and a backing plate 72 secured to the cage 17. The pressure plate 71 is movable longitudinally of the cage and is actuated by four plugs 73 which extend through the end wall of the cage 17 and which are separately actuated by fingers 74 fulcrumed on the end wall of the cage.

Each plug 73 is cup-shaped and contains a reciprocating plunger 75 adapted to contact with an adjusting screw 54$^a$ of one of the fingers 74. A coil spring 76 located within the plug 73 back of each plunger 75 is adapted to yieldingly transmit the pressure delivered by the contacting finger 74 to the plug 73 and, consequently, to the pressure plate 71.

The springs 76 equalize the pressure between the fingers 74 and permit minor inaccuracies in the adjustment of the fingers 74 relative to the sleeve 78 which could not exist if the springs were not employed.

By properly proportioning the strength of the springs 56 of the operating devices of the high and intermediate clutch mechanisms and the springs 76 of the operating device of the low speed clutch mechanisms, the pressure, with which the interleaving disks are forced together, and consequently the load, which may be imposed upon each clutch mechanism, may be controlled within close limits. Overloading of any of the transmission gear trains is prevented by the springs for the reason that when the load on one clutch mechanism is greater than that for which the operating springs are adjusted, the interleaving disks of that group start to slip and relieve the clutch mechanism of the excessive load.

The operating fingers 53, 66 and 74 are actuated by a sleeve 78 loosely mounted on the shaft 31 and movable longitudinally thereof. The inner end of each of the fingers contacts with the sleeve 78 and a conical surface 79 is provided on the sleeve and so located that the different sets of fingers are successively thrown into operation as the sleeve moves in the direction indicated by the arrow in Fig. 6. In moving the sleeve in this direction, the inner ends of the fingers are caused to ride up the inclined surface 79 and this throws one or more of the clutch mechanisms, contained in the cage 17, into operation. The fingers 74 are so located that the surface 79 of the sleeve 78 moves them to compress, through the agency of the plugs 73, the interleaving disks of the group 20 before the other two sets of fingers are thrown into operation. The fingers 66 are brought into operation after the fingers 74 are moved to the operative position and, through the agency of the pins 65, render the group 19 of interleaving disks effective as a clutch mechanism. Finally the fingers 53 are moved by the conical surface 79 to press the interleaving disks of the group 18 into gripping contact. By this arrangement the low speed gears, the intermediate speed gears and the high speed gears are brought successively into operation by one continuous movement of the sleeve 78.

Before the high, intermediate or low speed gears can be rendered operative, the gear 28 must be locked to the shaft 21. This is accomplished, as has been stated, by means of clutch device 29, which consists of a shiftable element keyed on the shaft 21 and provided on one side with teeth 81. The teeth 81 are adapted to coöperate with removable teeth 82 secured to the web of the gear 28. These teeth consist of bolts which are provided with heads properly shaped to engage the teeth 81 and which are secured in place on the web of the gear 28 by means of suitable nuts.

A ring 83 is rotatably mounted on the clutch device 29 and is adapted, through the agency of the bifurcated lever 84 mounted on a rod 85, to shift the clutch device 29 into and out of the operative position. The rod 85 extends through a wall of the casing 26 and is provided at its outer end and exterior to the casing with an operating lever 86.

When the low speed friction clutch mechanism alone is operative, the rotary motion of the shaft 16 is transmitted through the cage 17, the interleaving disks 67 and 68, the shaft 31 and the gear 32 to the gear 33 mounted on the shaft 25. When the intermediate speed friction clutch is operative, the rotary motion of the shaft 16 is transmitted to the shaft 22 through the agency of the cage 17 and from the shaft 22 through the gear 23 to the gear 24 mounted on the shaft 25. Since the interleaving disks of the group 20 remain in gripping contact after the group 19 is effective as a power transmitting clutch, it is necessary that the gear 33 be permitted to overrun or that the shaft 25 be permitted to rotate faster than it is driven by the gear 24. The intermediate and low speed clutch mechanisms are both in clutching contact when the high speed clutch mechanism is thrown into operation and consequently the shaft 25 is driven faster than either the gears 24 or 33 are capable of driving it. This condition of affairs is rendered possible by the overrunning devices 34 which are provided in the gears 24 and 33 and which are illustrated in Fig. 8 in connection with the gear 33. This gear, like the gear 24, is formed in two parts, a hub portion 88, which is keyed to the shaft 25, and a ring portion on which the teeth are provided and which is loosely mounted on the hub portion. Peripherally located slots are provided in the hub portion in which clutch or gripping rollers 89 are located. These rollers are pressed into contact with the inner peripheral surface of the rim portion by means of springs 91. When the shaft 25, and, consequently, the hub portion 88, tends to rotate faster than the rim portion of the gear (the rotation being in the direction indicated by the arrow in Fig. 8), the clutch rollers 89 disengage the inner peripheral surface of the rim portion of the gear and permit the rim portion to lag behind the hub portion. A tendency on the part of the rim portion to rotate faster than the hub portion causes the rollers 89 to lock the rim and hub portions together.

The reversing gears of the transmission mechanism are thrown into operation by means of the clutch devices 38 and 29. The clutch device 38 consists of an element which is feathered on the shaft 25 and which is provided with teeth 92 adapted to coöperate with teeth 93 provided on the gear 35. The clutch device 29 is provided with teeth 94 which coöperate with removable teeth 95 secured to the web portion of the gear 37. These removable teeth are similar to the teeth 82 provided on the gear 28. The clutch device 38 is provided with a rotatable collar 96 which is adapted, through the agency of a suitable lever 97, mounted on a shaft 98 to shift the clutch device from an inoperative to an operative position or vice versa. The rod 98 extends through the casing 26 and is provided at its outer end, and exterior to the casing, with an operating lever 99.

The friction disk clutch mechanisms and clutches 38 and 29 are operated by the same lever and the operating linkage is so arranged, that in moving from the neutral or inoperative position, one of the jaw clutches is thrown into operation prior to the friction clutch mechanism.

The sleeve 78 is actuated by means of a lever 101 which is bifurcated at its free end and is mounted on a shaft 102 extending through the casing 26. The bifurcated end of the lever engages a pin 103, which is carried by a ring 104 rotatably mounted on the sleeve 78. A lever 105 is mounted on the outer end of the shaft 102 exterior to the casing 26 and is actuated by means of a longitudinally shiftable linkage 106.

The lever 105 is provided at its free end with a roller 107 which projects into a slot 108 provided in the linkage 106. The slot is so shaped that the lever has three well defined positions, a neutral, a full-ahead and a reversing position. These are respectively illustrated in the Figs. 13, 9 and 11. The position of the lever 105 is varied by shifting the linkage 106 longitudinally. This shifts the sleeve 78 longitudinally and thereby controls the operation of the friction clutch mechanism.

When the lever 105 occupies the neutral position relative to the linkage 106, as illustrated in Fig. 13, the sleeve 78 is moved to such a position that none of the groups of interleaving disks are operative. As the lever is moved by the linkage 106 from the neutral to the full-ahead position, the groups 20, 19 and 18 of interleaving disks are successively thrown into operation. When the lever is moved from the neutral position to the reverse position, as illustrated in Fig. 11, the group 20 of interleaving disks are rendered effective as a power transmitting clutch.

The operating lever 86 of the clutch device 29 and the operating lever 99 of the clutch device 38 are actuated by a longitudinally shiftable linkage 110, which is connected to the same operating lever 111 as the linkage 106. The lever 86 is provided at its free end with a roller 112 which projects into and coöperates with a slot 113 provided in the linkage 110. The lever 99 is provided at its outer or free-end with a roller 114 which projects into and coöperates with a slot 115 located adjacent to the slot 113 in the linkage 110. The slots are so shaped that the levers 86 and 99 are turned, during one motion of the linkage, to move the clutch devices, with which they coöperate, from an operative to an inoperative position or vice versa. The slot 113 is so shaped that the lever 86 moves the clutch device 29 from an inoperative to an ahead position for motion of the linkage 110 in one direction and from a neutral to a reversing position for motion in the opposite direction. This locks either the gear 28 or the gear 37 to the shaft 21. The slots are so positioned relative to each other, that the levers 86 and 99 are simultaneously moved to the inoperative or neutral position.

The linkage 106 and the linkage 110 are so connected to the operating lever 111 that the levers 105, 99 and 86 occupy the neutral position at the same time, but one or both of the clutch devices 29 and 38 are thrown into operation prior to any of the friction disk clutch mechanisms. When the lever 111 is pushed forward to move the linkage 106 in the direction indicated by the arrow in Fig. 9, the linkage 110 is moved in the direction indicated by the arrow in Fig. 10 and the clutch device 29 is caused to lock the gear 28 to the shaft 21. Just subsequent to the locking of the gear 28 to the shaft, the low speed clutch mechanism or group 20 of interleaving disks are pressed into gripping contact and the low speed gear train is rendered effective. As the lever 111 continues to be moved in the direction indicated, the intermediate and high speed friction clutch mechanisms are successively thrown into operation. The slot 113 is so shaped that the clutch device 29 is not affected by the continued motion of the lever 111 and the slot 115 is so shaped that the clutch device 38 remains in the neutral or inoperative position during the entire motion of the lever 111 in the direction indicated. When the lever 111 is moved from the neutral to the reversing position the linkage 106 and the linkage 110 are moved in opposite direction to those indicated by the arrows and the clutch device 38 is caused to lock the gear 35 to the shaft 25 simultaneously with the locking of the gear 37 to the shaft 21 by the clutch device 29. This is immediately followed by the locking of the cage 17 to the shaft 31 through the agency of the group 20 of interleaving disks.

In Fig. 15 I have illustrated diagrammatically an automobile equipped with a transmission mechanism embodying my invention. The wheels on one side of the automobile are removed for convenience of illustration. The shaft 16 is driven by the engine and the shaft 21 is connected by a universal joint and bevel gears (not shown) to the driving axles of the car. The transmission mechanism illustrated may be employed on a car utilizing a chain drive. If this is the case, a gear box will be located immediately adjacent to the casing 26 and the axle carrying the chain sprockets will be geared to the shaft 21.

When the lever 111 is moved into the first ahead position, the low speed friction clutch mechanism becomes effective and the car is driven through the speed change gears 32, 33, 27 and 28. The next ahead position of the lever throws the intermediate clutch mechanism into operation and the car is then driven through the speed change gears 23, 24, 27 and 28. The overrunning device 34 in the gear 33 permits the rim portion of the gear 33 to lag behind the shaft 25. When the lever 111 is moved to the full-ahead position the shaft 16 is directly connected to the shaft 21 by the high speed clutch disk mechanisms and the overrunning device 34 in each of the gears 33 and 24 becomes operative. As the lever 111 is moved back to the inoperative or neutral, the high speed, intermediate and low clutch mechanisms are successively rendered inoperative and finally the clutch device 29 is moved from the operative position and releases the gear 28. Upon moving the lever 111 to the reverse position the clutch devices 38 and 29 are first thrown into operation and caused to lock the gears 35 and 37 to the shafts 25 and 21 respectively. The low speed clutch mechanism is then thrown into operation and the car is driven through the gears 32, 33, 35, 36 and 37.

The shaft 21 is never disconnected from the driving shaft 16 during the operation of the transmission mechanism and consequently the driving axle of the car is always connected to the engine except when the lever 111 is moved to the neutral position. As soon as the high speed clutch mechanism is rendered ineffective the load is automatically transferred to the intermediate gear trains, the clutch mechanism of which has been held in gripping contact during the operation of high gear speed trains. The low speed gear train is thrown into operation as soon as the intermediate clutch mechanism is rendered ineffective. In moving from a lower to a higher speed the low speed train is effective in driving the car up until the time the next higher speed gear train has relieved it and taken up the load of the car.

In accordance with the provisions of the patent statutes, I have described the principle of operation of my invention, together with the apparatus which I now consider to represent the best embodiment thereof, but I desire to have it understood that the apparatus shown is only illustrative and that the invention can be carried out by other means.

What I claim is:

1. The combination of a driving element, a driven element, speed change gears between said elements, a clutch mechanism for controlling the operation of said gears and a clutch device between said gears and said driven element for rendering said clutch mechanism effective in transmitting power to said driven element.

2. The combination of a driving element, a driven element, speed change gears, a plurality of clutch mechanisms for controlling the operation of said gears located between said driving element and said gears and a clutch device between said gears and said driven element for rendering certain selected gears effective in transmitting power to said driven element.

3. The combination of a driving element, a driven element, speed change gears between said elements, a plurality of clutch mechanisms for said gears and a clutch device between said gears and said driven element for rendering certain selected gears effective in transmitting power to said driven element.

4. In combination, a driving element, a driven element, a set of speed change gears, a clutch mechanism for controlling the operation of said gears and for directly connecting said elements and a clutch device between said gears and said driven element which is effective only during the operation of said gears.

5. In a transmission mechanism, a driving element, a driven element, a set of speed change gears between said elements, means for controlling the operation of said gears, a single clutch device for connecting said driving to said driven element and a clutch between said gears and said driven element which is only effective in transmitting power during the operation of said gears.

6. In a transmission mechanism, a driving element, a driven element, a set of speed change gears between said elements, a clutch mechanism for controlling the operation of said gears, means for directly connecting said driving to said driven element and a clutch device between said gears and said driven element which is only effective in transmitting power during the operation of said gears.

7. In a transmission mechanism, a driving element, a driven element, speed change gears between said elements, means for controlling the operation of said gears, a single clutch mechanism for directly connecting said driving element to said driven element and a clutch device between said gears and said driven element which is only effective during the operation of said gears.

8. The combination of a driving element, a driven element, a set of speed change gears, a composite multiple disk friction clutch device for controlling the operation of said set of gears and for connecting said driving and driven elements and a single actuating device arranged to successively operate or set different portions of said clutch device.

9. In combination, a driving element, a driven element, speed change gears between said elements, a clutch mechanism between said driving element and said gears for controlling the operation of said gears and a clutch device between said gears and said driven element which is effective during the operation of said gears.

10. The combination in transmission gearing of the driving element and a driven element, continually meshing speed change gears, a plurality of clutch mechanisms for controlling the operation of said gears, a separate clutch mechanism for directly connecting the driving and driven elements, over-running devices for said gears and a clutch device between said gears and said driven element effective only during the operation of said gears.

11. The combination of a driving element, a driven element, a set of speed change gears between said elements the gears of which are continually in mesh, a clutch mechanism for rendering said gears effective in transmitting power, means for directly connecting said driving and driven elements, an over-running device for said set of gears and a clutch device between said gears and said driven element effective only during the operation of said gears.

12. The combination of a driving element, a driven element, a set of speed change gears, a composite clutch device for controlling the operation of said gears and for directly connecting said driving element to said driven element and a clutch located between said gears and said driven element which is effective only during the operation of said gears.

13. The combination of a driving element, a driven element, speed change gears, a composite clutch device for controlling the operation of said gears and a clutch device located between said gears and said driven element.

14. The combination of a driving element, a driven element, a set of speed change gears between said elements, a composite clutch mechanism for rendering said set effective in transmitting power and for directly connecting said driving element to said driven element and a clutch device between said gears and said driven element effective only during the operation of said gears.

15. In a transmission mechanism, a plurality of sets of speed change gears, a friction clutch mechanism comprising separate groups of interleaving disks, separate sets of operating fingers for each group of disks, a jaw clutch device and means for throwing said jaw clutch device into operation and subsequently one or another of said sets of operating fingers.

16. In a transmission mechanism, speed change gears, a plurality of independent clutch mechanisms for controlling the operation of said gears, a positive clutch device and means common to said clutch mechanisms and said positive clutch device for throwing said clutch device into operation and subsequently said clutch mechanisms.

17. In combination with driving and driven elements, a plurality of speed change gears between said elements and provided with over-running ratchets, clutch mechanism comprising a plurality of independent friction clutches for controlling the operation of said speed change gears.

18. The combination of a driving element, a driven element, speed change gears between said elements, a plurality of independent clutch mechanisms for controlling the operation of said gears, a clutch device between said gears and said driven element for rendering certain selected gears effective in transmitting power and a single lever for operating the clutch mechanisms and the clutch device whereby said clutch device is thrown into operation prior to said clutch mechanisms.

19. The combination of a driving element, a driven element, a set of speed change gears provided with over-running devices, a composite clutch device for controlling the operation of said set of gears consisting of a plurality of independent superposed multiple disk clutches and a single actuating device arranged to successively operate said clutches.

20. The combination of a driving element, a driven element, a multiple disk friction clutch device for directly connecting said elements, a set of speed change gears, a composite multiple disk friction clutch device superposed on said other clutch device for controlling the operation of said speed change gears and for connecting said driving and driven elements through said gears and a single actuating device arranged to successively operate or set all of said clutch devices.

21. The combination of a driving element, a driven element, a friction clutch for directly connecting said elements, speed change gears, a plurality of friction clutches superposed on said other clutch for controlling the operation of said speed change gears and for connecting said driving and driven elements through said gears, means coöperating with said speed change gears whereby the driven element is rotated in a direction opposite to the direction of rotation of said driving element and a single actuating device arranged to successively operate said clutches.

22. The combination of a driving element, a driven element, a set of speed change gears, a composite multiple disk clutch device one portion of which is adapted to directly connect said driving and driven elements while the other portions are adapted to control the operation of said speed change gears, telescoping sleeves surrounding said driven element for connecting said driving and driven elements through said gears and a single actuating device arranged to successively operate or set the different portions of said clutch device.

23. The combination of a driving element, a driven element, a set of speed change gears, a composite multiple disk clutch device one portion of which is adapted to directly connect said driving and driven elements while the other portions are adapted to control the operation of said speed change gears and telescoping sleeves surrounding said driven element for connecting said driving and driven elements through said gears.

24. A composite clutch device consisting of a plurality of superposed multiple friction disk clutches, yielding means for setting said clutches and a single actuating device arranged to actuate said means for successively operating or setting said clutches.

25. The combination of a driving element, a power delivery shaft, a multiple disk friction clutch for directly connecting said element and said shaft, a plurality of driven shafts telescopically arranged with relation to said power delivery shaft, speed change gears between said driven shafts and said power delivery shaft, a multiple disk friction clutch device for each of said driven shafts superposed upon the clutch for directly connecting said driving element and said power delivery shaft, means for rotating said power delivery shaft in the opposite direction from said driven shafts and means for successively operating said clutches.

26. The combination of a driving element, a power delivery shaft, a multiple disk friction clutch for directly connecting said element and said shaft, a plurality of driven shafts telescopically arranged with relation to said power delivery shaft, speed change gears between said driven shafts and said power delivery shaft, a multiple disk friction clutch device for each of said driven shafts superposed upon the clutch for directly connecting said driving element and said power delivery shaft, means for rotating said power delivery shaft in the opposite direction from said driven shafts and a single actuating device arranged to successively operate said clutches.

27. The combination of a driving shaft carrying an enlarged end, a power delivery shaft one end of which is journaled in a bearing carried in said enlarged end, a plurality of driven shafts telescopically arranged with relation to said power delivery shaft, a multiple disk friction clutch device for directly connecting said driving shaft and said power delivery shaft, a multiple disk friction clutch device for each of said driven shafts, means for successively operating said clutches, gearing between said driven shafts and said power delivery shaft whereby said power delivery shaft may be driven in the same direction as said driven shafts but at different speeds, means utilizing said gearing for driving said power delivery shaft in the opposite direction to said driven shafts and overrunning devices associated with said gearing.

28. The combination of a driving shaft, a power delivery shaft, a friction clutch for directly connecting said shafts, a multiple speed gearing device, a plurality of friction clutches for controlling the operation of said gearing device, reversing means, clutches associated with said reversing means and said gearing device the position of which determines the direction of rotation of said power delivery shaft with relation to said driving shaft and means for successively operating said friction clutches.

29. The combination of a driving element, a driven element, a set of continually meshing speed change gears, a composite plate clutch device for controlling the operation of said set of gears and for connecting said driving and driven elements and a single actuating device arranged to successively operate or set the different portions of said clutch device.

30. The combination of a driving element, a driven element, continually meshing speed change gears, a plurality of independent superposed multiple disk friction clutches for controlling the operation of said speed change gears and for connecting said driving and driven elements through said gears and means for operating said clutches.

31. The combination of a driving element, a driven element, continually meshing speed change gears, a plurality of multiple disk friction clutches one of which is adapted to directly connect said driving and driven elements while the others are adapted to control the operation of said speed change gears and to connect said driving and driven elements through said gears, a single actuating device arranged to successively operate or set said clutches and means coöperating with said gears for rotating said driven element through said gears in the opposite direction from the driving element.

32. A composite clutch device consisting of a plurality of independent superposed multiple friction disk clutches and a single actuating device arranged to successively operate said clutches.

33. A composite clutch device consisting of a plurality of independent superposed multiple friction disk clutches, a single actuating device arranged to successively operate said clutches and yielding means between said clutches and said actuating device.

34. In combination with a driving element, a driven element, a friction clutch for directly connecting said elements, reversing gears for rotating said driven element in a direction opposite to the direction of rotation of the driving element; speed change gears for rotating the driven element at different speeds in the same direction as the driving element, and a plurality of friction clutches, superposed on said first mentioned clutch, for controlling the operation of said speed change gears.

35. The combination of a driving element, a driven element, a set of speed change gears for rotating said driven element in a direction opposite to the direction of rotation of the driving element, continually meshing speed change gears, a plurality of multiple disk friction clutches one of which is adapted to directly connect said driving and said driven element, while the others are adapted to control the operation of said speed change gears and to connect said driving and said driven elements through said gears, and a single actuating device arranged to successively operate or set said clutches.

In testimony whereof, I have hereunto subscribed my name this 23rd day of October, 1908.

LELAND F. GOODSPEED.

Witnesses:
CHARLES W. McGHEE,
E. W. McCALLISTER.